United States Patent
Weichholdt et al.

(10) Patent No.: US 6,866,580 B2
(45) Date of Patent: Mar. 15, 2005

(54) COMBINE WITH PIVOTABLE STRAW GUIDE ELEMENT AND STRAW CHOPPER

(75) Inventors: Dirk Weichholdt, Sarreguemines (FR); Fritz Lauer, Kraehenberg (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/679,592

(22) Filed: Oct. 6, 2003

(65) Prior Publication Data

US 2004/0132517 A1 Jul. 8, 2004

(30) Foreign Application Priority Data

Oct. 23, 2002 (DE) .......................................... 102 49 257

(51) Int. Cl.⁷ ............................................... A01F 12/40
(52) U.S. Cl. ..................................................... 460/112
(58) Field of Search ............................... 460/111, 112, 460/85; 56/500

(56) References Cited

U.S. PATENT DOCUMENTS

| | | | | |
|---|---|---|---|---|
| 3,670,739 A | * | 6/1972 | Rowland-Hill | 460/66 |
| 3,712,309 A | * | 1/1973 | Schmitz | 460/112 |
| 4,056,107 A | * | 11/1977 | Todd et al. | 460/112 |
| 4,510,947 A | * | 4/1985 | Devriese | 460/99 |
| 4,628,946 A | * | 12/1986 | De Busscher et al. | 460/78 |
| 4,884,993 A | * | 12/1989 | Hemker et al. | 460/14 |
| 5,021,028 A | * | 6/1991 | Kersting et al. | 460/85 |

FOREIGN PATENT DOCUMENTS

| | | |
|---|---|---|
| DE | 43 13 841 A | 11/1994 |
| EP | 0 224 803 | 11/1986 |

* cited by examiner

Primary Examiner—Árpád Fab Kovács

(57) ABSTRACT

A combine having an axial separator and a discharge beater adjacent the outlet of the axial separator is provided with a pivotable straw guide element. The discharge beater is arranged to feed crop material other than grain into a straw chopper. The straw guide element is arranged between the outlet of the discharge beater and the inlet of the straw chopper. The straw guide element is pivotable between a chopping position in which the crop material other than grain reach the straw chopper and a long straw deposition position in which the crop material other than grain are deposited on the ground and not chopped. The pivot axis of the straw guide element is coaxial with the rotation axis of the discharge beater.

9 Claims, 3 Drawing Sheets

COMBINE WITH PIVOTABLE STRAW GUIDE ELEMENT AND STRAW CHOPPER

FIELD OF THE INVENTION

The present invention is directed to a combine with an axial separator and a discharge beater adjacent to the outlet of the axial separator, a straw guide element is arranged between the outlet of the beater and the inlet of a straw chopper to selectively direct the crop material other than grain to or past the straw chopper.

BACKGROUND OF THE INVENTION

This type of combine is known from DE 43 13 841 A. The discharge beater serves to remove the crop material other than grain from an axial separator and feed them to a straw chopper. To improve lateral distribution of the crop residues, an adjustable straw guide is provided between the outlet of the discharge beater and the inlet of the straw chopper. In one embodiment with a straw walker, no discharge beater is used, a feed plate mounted to pivot on its lower end is provided, which, in one position, releases the straw to the straw chopper, and, in its other position, releases the straw onto the ground in front of the straw chopper. For space reasons, this type of feed plate would not be usable on combines with axial separation devices and their connected beaters.

SUMMARY OF THE INVENTION

It is an object of the present invention to provide a combine with an axial separator and a discharge beater with a simple assembly for switching between longitudinal straw delivery and straw chopping operations.

A straw guide element adjacent to the discharge beater can be pivoted between the longitudinal straw delivery position, in which the crop material other than grain is generally placed on the ground in front of the straw chopper, and the chopping position, in which the crop material other than grain is fed to the straw chopper. It moves on a circular track between the chopping and longitudinal straw delivery position.

In this manner, a compact design of the straw guide device is obtained. The straw chopper can be fastened rigidly to the frame of the combine, since movement between the longitudinal straw delivery and chopping positions is unnecessary.

The straw guide element is preferably pivotable around an axis running parallel to the axis of rotation of the discharge beater. By having the straw guide element being an enveloping arc segment of the discharge beater, the pivot axis of the straw guide element and the rotational axis of the discharge beater coincide. In this embodiment, the straw guide element preferably encloses the beater concentrically. In the position in which the straw guide element conveys the crop residues, i.e., into the longitudinal straw delivery position and/or the chopping position, low-friction guiding of the crop residues is possible, because of the lack of sharp deflections of the crop residue flow.

In the illustrated embodiment, the pivotable straw guide element is pivotable around a horizontal axis that runs transverse to the direction of travel of the combine. The crop material other than grain can therefore be diverted more or less far to the rear and upward and conveyed either into the straw chopper or onto the ground. If the axial separator releases the crop material other than grain in a lateral direction, the pivot axis of the straw guide element and the discharge beater, could also extend in the direction of travel.

The straw guide element preferably covers the inlet of the straw chopper in the longitudinal straw delivery position and leaves it open in the chopping position. The straw is therefore prevented from entering the straw chopper in the longitudinal straw delivery position, whereas it reaches the straw chopper without problem in the chopping position. The straw guide element is pivoted upward and to the rear when it is brought from the longitudinal straw delivery position to the chopping position. However, a reverse arrangement would also be conceivable, in which the straw guide element guides the crop residue flow into the chopping position rearward; and is pivoted rearward or forward into the longitudinal straw delivery position.

Adjustable or fixed guides can be provided between the discharge beater and the straw chopper, in order to feed the straw chopper as uniformly as possible. Similar straw guides can be arranged downstream of the straw chopper and/or downstream of the straw guide element brought into the longitudinal straw delivery position.

DETAILED DESCRIPTION

Figure 1:
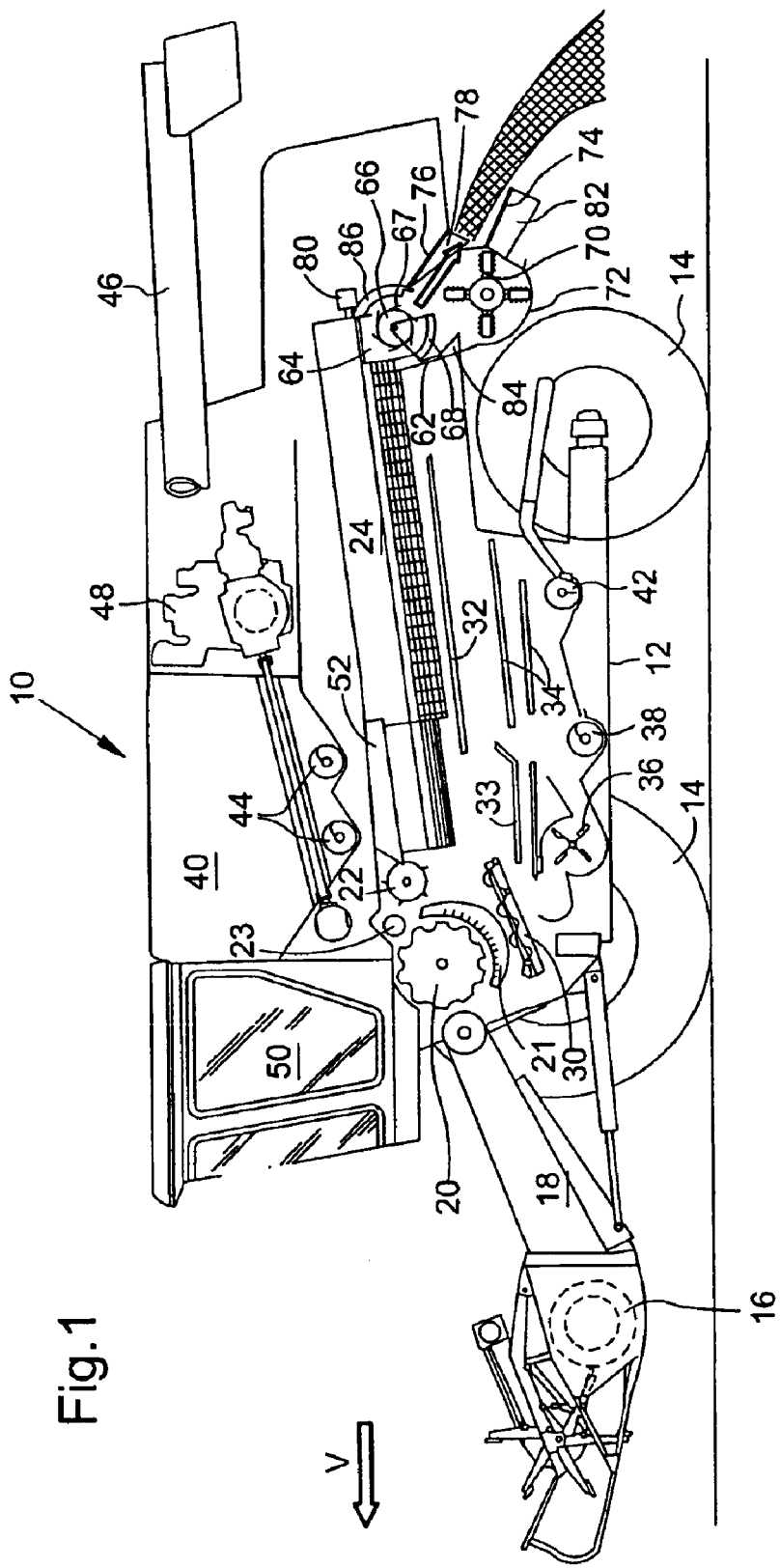
FIG. 1 is a side schematic view of a combine having an axial separator and a discharge beater partially enclosed by a straw guide element and followed by a straw chopper, wherein the straw guide element is in the longitudinal straw delivery position.

FIG. 1 shows a self-propelled combine 10 having a support frame 12 that is supported on the ground by wheels 14. The wheels 14 are rotated by a propulsion assembly, not shown, in order to move the combine 10 over a field being harvested. A harvesting assembly 16 is connected to the front of the combine 10, in order to harvest the crop from the field during forward movement V of the combine 10. The harvested crop is fed upward and rearward through a feeder house 18 to threshing and separator assemblies located inside the support frame 12. The threshing assembly comprises a transversely arranged threshing cylinder 20 and associated concave 21, to which the harvested product is first fed. However, it is also conceivable to omit the transversely arranged threshing cylinder 20 and associated concave 21 and use an axial crop processing assembly having an axial threshing section and an axial separation section. A stripping roll 23 and a beater 22, together with a feed housing, convey the threshed crop from threshing cylinder and concave 20 and 21 to an axial separator 24. The axial separator 24 is driven in its rear by a gear mechanism 80. Although the present invention is illustrated as having a pair of side by side axial separators any number of arrangements could be used including a single axial separator or more than two side by side axial separators. All direction comments, like front, rear, above and below, subsequently refer to the forward direction of travel V of the combine 10.

Grain and chaff that are separated during the threshing process fall onto at least one screw conveyor 30 that feeds both to a conditioning pan 33. Grain and chaff that emerge from the axial separator 24, fall onto a grain pan 32 that conveys them to the conditioning pan 33. The conditioning pan 33 directs the grain and chaff to sieves 34. A cleaning fan 36 directs an air blast upwardly through the sieves 34 to separate the chaff from the grain. The cleaned grain falls through the sieves 34 to the floor of the combine and is fed by a clean grain auger 38 to an elevator (not shown), which supplies it to a grain tank 40. A tailings auger 42 sends the unthreshed heads through an additional elevator (not shown), and introduces the unthreshed heads back into the threshing assembly. The chaff can be discharged out the back of the sieves 34 through a rotating chaff distributor. The cleaned grain can be unloaded from the grain tank 40 by an unloading system with grain tank cross augers 44 feeding an unloading auger 46. The various assemblies are driven by an internal combustion engine 48 that is controlled from a driver's cab 50.

Figure 2:
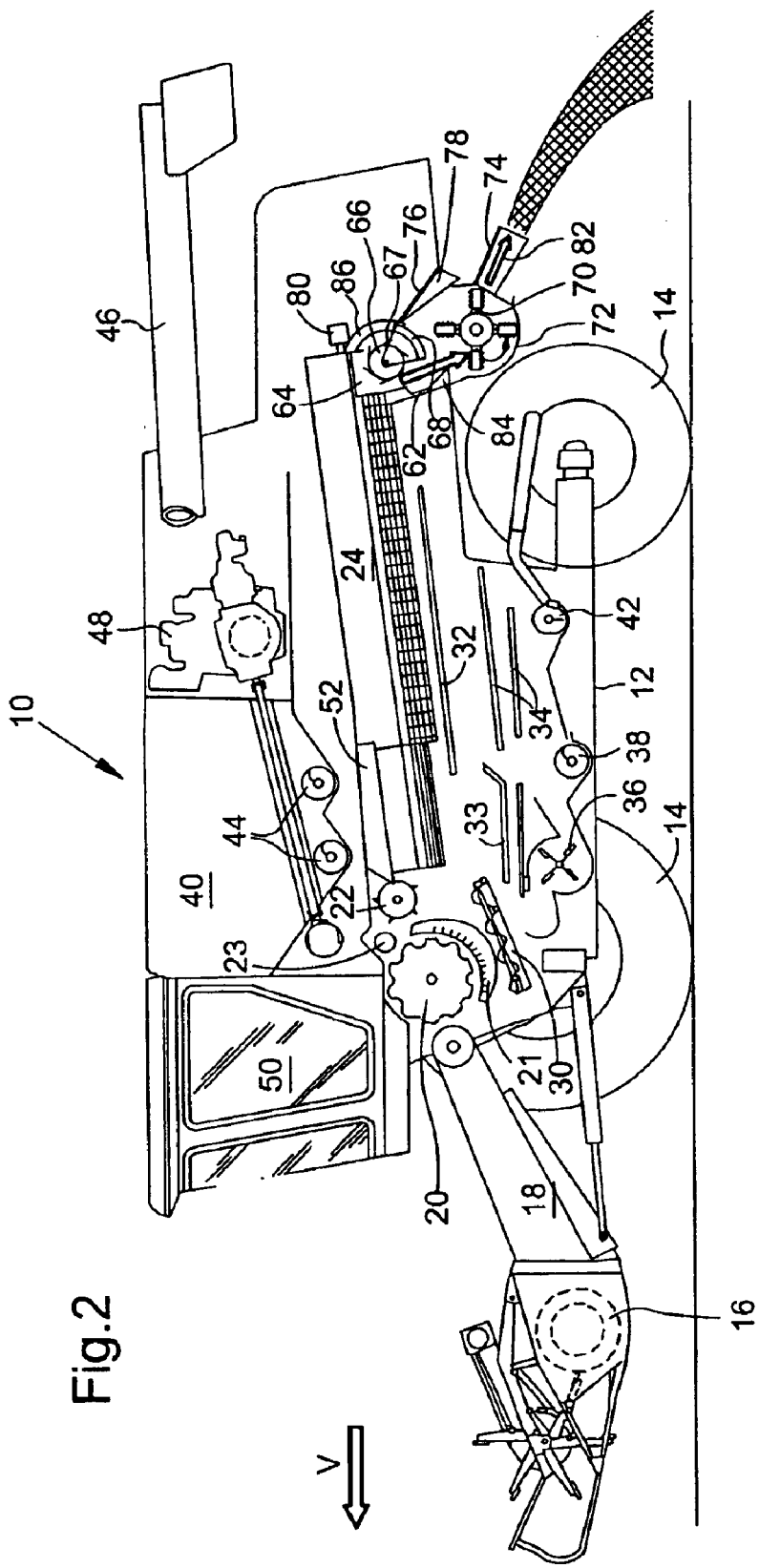
FIG. 2 is a side schematic view of the combine from FIG. 1 with a straw guide element brought in the chopping position.

Large components of the crop material other than grain (straw) are discharged downward by the axial separator 24 through an outlet 64 on the bottom of the rear end of the axial separator 24 (closed rearward). By centrifugal force and gravity, the crop residues fall into a vertical discharge shaft that is bounded on the front by a front wall 62. A discharge beater 66 having blades 67 is arranged beneath outlet 64. The discharge beater 66 is enclosed at the rear by a rear wall 86. The beater 66 is rotated counterclockwise in FIG. 1 around its longitudinal axis, which extends transverse to the direction of travel. Roughly at half-height of the front wall 62, a straw guide element 68, pivotable as a whole around the rotational axis of the beater 66, lies against said front wall, just beneath the rotational axis of beater 66. The straw guide element 68 can be pivoted around this axis between the longitudinal straw delivery position shown in FIGS. 1 and 3 and the chopping position depicted in FIGS. 2 and 4.

Beneath and slightly behind the beater 66, a known straw chopper 70 is arranged in housing 72 and can be rotated (counterclockwise in the figures) around a horizontal axis running transverse to the direction of travel. It includes a cylindrical body with pendulously mounted chopper blades, which cooperate with stationary counterblades arranged in housing 72, in order to chop the crop material and distribute them on the field by means of a straw distributor hood 74. The straw distributor hood 74 is equipped with straw guide plates 82 over the cross-sectional width of combine 10. Part of the housing 72 can also extend above the straw chopper 70 from the front end of the straw distributing hood 74 in arc-like fashion roughly to a point above the rotational axis of straw chopper 70.

Figure 3:
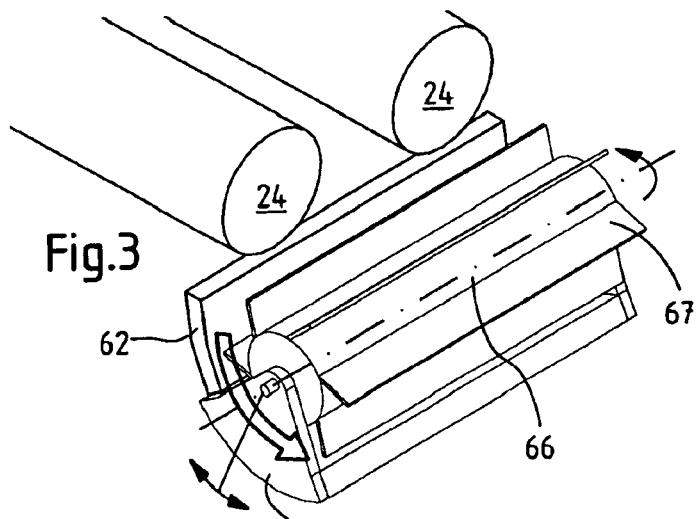
FIG. 3 is a perspective rearward view of the discharge beater with the straw guide element brought into the longitudinal delivery position.
Figure 4:
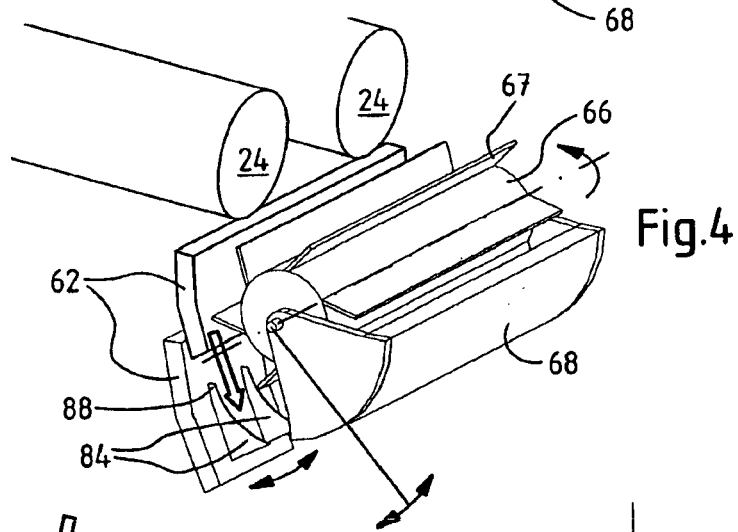
FIG. 4 is a perspective rearward view of the discharge beater with the straw guide element brought into the chopping position.

The straw guide element 68 is curved concave (in arc-like fashion) and encloses the discharge beater 66 concentrically over an angle range of about 45°. It can be pivoted on its outer ends in the transverse direction on support frame 12 of combine 10, as shown in FIGS. 3 and 4. The straw guide element 68 extends in the longitudinal straw delivery position shown in FIGS. 1 and 3 from the front wall 62 to just beyond the rotational axis of straw chopper 70. In this position, the straw guide element 68 causes the threshed out crop material to be discharged by the discharge beater 66 beneath an ejection hood 76 obliquely to the rear and downward. The ejection hood 76, like the straw distributor hood 74, is provided with straw guide plates 78 on its bottom, in order to define the width of the windrow, in which the crop material is deposited.

In the chopping position, the straw guide element 68 is pivoted rearward around the rotational axis of beater 66 (counterclockwise with reference to FIG. 1). Because of this, an opening is formed between the front wall 62 and the front edge of straw guide element 68, through which the crop material reaches the straw chopper 70. The straw guide element 68 lengthens the rear wall 86 downward and forward in this position. After the straw guide element 68 has been shifted to its chopping position, the lower portion of the front wall 62 can be provided with pivotable guides 84, in order to feed the straw chopper 70 as uniformly as possible. The crop residues are chopped in straw chopper 70 and discharged obliquely, rearwardly and downwardly. Straw guides 82 are located beneath the straw distribution hood 74 at the discharge of the straw chopper 70 to evenly distribute the chopped crop material onto the field.

The straw guide element 68 can be moved between the longitudinal straw delivery and chopping positions manually or by remote-control using appropriate motors. The remote control operation would preferably be controlled from the driver's cab 50.

Figure 5:
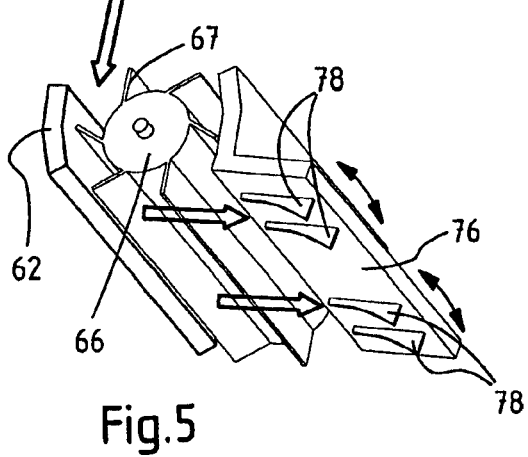
FIG. 5 is a perspective view of the discharge beater and a discharge hood from below, in which the straw guide element was left out for reasons of clarity.
Figure 6:
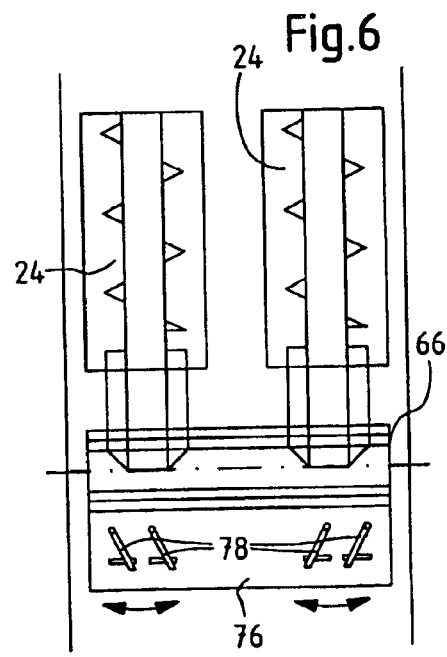
FIG. 6 is a top view of the axial separator of the combine and the discharge hood.

The pivotable guides 84 on the lower part of front wall 62 are fastened on their front ends to pivot on front wall 62 transverse to the axes 88 running in the direction of straw flow, as shown in FIG. 4. In a simple variant, they can be manually adjusted and locked. In another variant, they can be moved together by a common motor or several motors, each allocated to individual or several pivotable guides 84. The motors can be manually controlled by the operator in the driver's cab 50. However, a sensor (or several sensors) can also be provided that records the width distribution of the straw and controls the motor or motors, as described in DE 102 15 026 A, whose disclosure is included as reference. The pivotable guides 84, during chopping operation, make it possible to uniformly feed the straw chopper 70 over its width. The straw guide plates 78 for longitudinal straw delivery operation and the straw guide plates 82 for chopping operation can also be pivoted on their front ends and moved laterally on their rear ends, in order to define the width of the windrow, as indicated in FIGS. 5 and 6 for the straw guide sheets 78. Adjustment can occur manually or by motor, especially with a control through appropriate sensors that automatically ensure achievement of the desired scattering width.

Having described the illustrated embodiment, it will become apparent that various modifications can be made without departing from the scope of the invention as defined in the accompanying claims.

What is claimed is:

1. A combine having an axial separator, the axial separator is provided with an outlet in communication with a discharge beater, the discharge beater can convey crop material other than grain discharged by axial separator to a straw chopper, a straw guide element is arranged between the discharge beater and the straw chopper, characterized by the straw guide element is movable around a pivot axis between a chopping position, in which the crop material other than grain enters the straw chopper, and a longitudinal straw delivery position, in which the crop material other than grain is expelled from the combine unchopped and wherein the pivot axis of the straw guide element is coaxial with the rotational axis of the discharge beater.

2. The combine as defined by claim 1 wherein the straw guide element concentrically encloses a partial area of the discharge beater.

3. The combine as defined by claim 2 wherein the combine has a forward direction of travel, the pivot axis of the straw guide element, runs horizontal and transverse to the direction of travel of the combine.

4. The combine as defined by claim 3 wherein the straw chopper has an inlet, the straw guide element in the longitudinal straw delivery position covers the inlet of the straw chopper and uncovers the inlet in the chopping position.

5. The combine as defined by claim 4 wherein the straw guide element can be pivoted from the chopping position rearward and upward into the longitudinal straw delivery position.

6. The combine as defined by claim 5 wherein guides are arranged upstream from the straw chopper.

7. The combine as defined by claim 6 wherein the guides arranged upstream from the straw chopper are pivotable.

8. The combine as defined by claim 5 wherein an ejection hood is located downstream from the discharge beater, the ejection hood is provided with straw guide plates, the crop material other than grain runs along the ejection hood when the straw guide element is brought into the longitudinal straw delivery position.

9. The combine as defined by claim 7 wherein the straw guide plates are adjustable.

* * * * *